Patented Jan. 5, 1926.

1,568,215

UNITED STATES PATENT OFFICE.

CORNELIUS S. FLEMING, OF BERKELEY, CALIFORNIA, ASSIGNOR TO THE PARAFFINE COMPANIES, INC., OF SAN FRANCISCO, CALIFORNIA, A CORPORATION OF DELAWARE.

PAINT.

No Drawing. Application filed November 28, 1921. Serial No. 518,242.

*To all whom it may concern:*

Be it known that I, CORNELIUS S. FLEMING, a citizen of the United States of America, and a resident of Berkeley, in the county of Alameda and State of California, have invented a new and useful Paint, of which the following is a specification.

My invention relates to paints and especially to a paint in which a metal powder is used as a pigment. One of the objects of the invention is the provision of a paint particularly suitable for application over prepared roofings or other surfaces previously treated with asphaltum paint or enamel. Another object of the invention is the production of a paint which may be used on roofings having an asphaltic coating to secure light colored effects including white or silvery white, gold and copper red.

Another object of the invention is a paint having great durability and which will impart to the surface to which it is applied a similar characteristic in high degree.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

While the paint of my invention will fill a real want in several arts, it is contemplated that its chief application will be in the field of roof paints which are applied over the so-called prepared roofings. It adds durability to the roofing because the flat overlapping scales or flakes of the metallic powders forming one of its ingredients protect the bituminous coatings from the action of sunlight, oxidation and impact of rain, and it may be applied to a new roofing or for giving new life to an old roofing. It will be found especially useful in conjunction with the improved roofing material described in my copending application Serial Number 518,281, since it enables an owner of a building covered in part with my improved roofing material, and in part with the ordinary roofing, to paint the latter and thus bring all to one standard. In a similar way it may be applied over a patched roofing formed of the ordinary materials so that all may be brought to one standard and the durability of the roof as a whole greatly increased.

My paint may also be used in the application of designs to roofing materials or fabrics. In this use, it may be applied by means of a cut type or stereotyped roll or similar means inked with the paint in the ordinary manner and impressed against the roof material or fabric to deposit thereon a printed design. It may also be applied with a paint gun or brush thru a stencil.

Besides roofing, the paint may be applied over asphaltic paints or over asphaltic enamels such as are used in the interior of ships or for the painting of electric wiring or conduits which have coverings or coatings containing bituminous composition. On such work, if in the interior, it is possible to paint over this first coating with a second coat of ordinary paint of any desired color without the bitumen staining the superposed coating.

By use of the paint a badly worn and otherwise almost useless prepared roof may be restored cheaply and satisfactorily. This is done by first giving the entire surface of the worn roof a coating of a bituminous roof-coating paint which will saturate the exposed felt fibers and build up a substantial new coating. My paint is then applied over the foundation coat and the resultant roofing is in a condition of usefulness practically on a par with a new piece of roofing coated with my paint. Up to this time, on prepared roofings it has been possible to secure only the darker colors, such as black, brown, dark red or dark green. The added attractiveness and value of the lighter colors will be readily appreciated.

To make my paint thirty pounds of California asphaltum of a hardness classed as "D" grade is melted in a suitable kettle and then withdrawn a safe distance from all exposed lights or fire and the contents allowed to cool sufficiently, say to 240° Fahrenheit so that violent boiling will not take place on the addition of the next ingredient. By "D" grade California asphaltum is meant an asphalt derived from a petroleum or asphaltic base by the process of distillation accompanied by the use of steam in the still, the asphalt to have a penetration of 15 to 20 at 77° F. and a softening point ranging from 135° to 150° F. both by the methods of the American Society for Testing Materials, Standards of 1921. A blown or oxidized asphalt having a penetration ranging between 12 and 20 and having a softening point ranging from 140° to 190° F. both by the same standards, will give satisfactory results. Six and one quarter gallons of commercial benzole is now added a little at a time with constant stirring until the entire quantity is incorporated. The mixture will now have cooled to such a point that evaporation will practically cease. When cold, thirty pounds of finely flaked metallic particles known as bronzing powder, is added and stirred until the mass is thoroughly commingled.

If aluminum bronzing powder is used the paint will produce a white or silvery white effect. The copper bronze and the gold bronze will each produce their characteristic colors in the paint.

By benzole it is understood that I mean a solvent which consists of more than 90% by volume of the chemical compound $C_6H_6$. Benzole has been found to have the property of causing the metallic particles of the bronzing powder to float to the surface of paint mixtures made as above described. Other solvents have this property, including carbon bisulphide, chloroform and carbon tetrachloride, all of which are solvents for the "D" grade asphaltum. In fact my experiments tend to show that any good solvent for this asphaltum possesses the property of making the metallic particles float in the paint mixture. This property is of high importance in my invention since when the paint is applied, the metallic particles immediately floating to the surface form a coating of overlapping flakes or scales which is of chief importance in securing the durability characterizing my paint.

Instead of benzole, mixtures containing a considerable amount of benzole may be used. This offers advantages in performing the process of making the paint. For instance, two gallons of coal oil or turpentine substitute, both of which have higher boiling points than benzole, may be added to the hot asphaltum first, and after the hot mixture has thus been cooled 4¼ gallons of benzole may be added. Thus smaller evaporation losses of benzole are experienced. Grades of benzole containing lower percentages of $C_6H_6$ may be used, but cannot be mixed with coal oil or turpentine substitute to such a degree as the purer material.

Carbon bisulphide makes a satisfactory solvent, also a mixture, half and half, of carbon bisulphide and ethyl acetone. In these cases it is desirable to dissolve the asphaltum in the solvent when cold. This may be accomplished by breaking the asphaltum into small lumps, and placing it in the solvent in a closed vessel, mechanically stirring until complete solution has been achieved.

Gasoline and benzine may also be used with benzole in the proportion of about one third gasoline or benzine to two thirds benzole. As a matter of economy however I prefer a solvent consisting of benzole, or of benzole mixed with benzine or turpentine substitute or gasoline in the proportions stated.

It is to be noted that benzine, coal oil, gasoline and similar petroleum products are not good solvents of "D" grade California asphaltum since they dissolve merely the petrolene and not the asphaltenes which are contained in the asphaltum. So also it is found that acetone will cause the metallic particles to float, but it is not a solvent for asphaltum although it will dissolve certain of the bituminous tars and pitches.

Instead of asphaltum, similar bituminous materials may be employed. Stearine pitch of a similar degree of hardness gives good results. Rosin may be used but is not considered equal to asphaltum or stearine pitch which are normally used in roof coatings. Pine pitch may also be used.

It will thus be seen that there is a considerable latitude in the choice of materials which may be employed in making the paint, with the exception of the metallic powders, which my present experiments show are limited to those powders known commercially as bronzing powders, including the aluminum bronze, copper bronze and gold bronze.

It has been found that the metallic particles will not float indefinitely in the paint. Consequently if the paint is not to be used immediately after it is made it is desirable to delay mixing the bronze powder until immediately before use.

The paint is applied in the ordinary manner with a brush and upon drying, that is to say, upon evaporation of the solvent and the hardening of the vehicle or asphaltum, the finely flaked metallic particles are found to form a surface coating firmly held and superposed on the vehicle or foundation coating of asphaltum.

I claim:

1. A paint comprising asphaltum and finely flaked metallic particles.

2. A paint comprising asphaltum and a bronzing powder.

3. A paint comprising asphaltum, a volatile solvent for the asphaltum and a bronzing powder.

4. A paint comprising asphaltum, finely flaked metallic particles and a solvent for the asphaltum having the characteristic of floating the metallic particles.

5. A paint comprising asphaltum, bronzing powder, and a solvent for the asphaltum having the characteristic of floating the particles of bronzing powder.

6. A paint comprising a vehicle which forms the foundation coating when the paint is dry, a finely flaked metal which forms a surface coating on the dried vehicle and a volatile solvent for the vehicle having the property of floating the flakes of metal in the solution of vehicle and solvent.

7. A paint comprising asphaltum, benzole and bronzing powder.

8. A paint comprising asphaltum, benzole and bronzing powder in the proportions of 30 pounds each of asphaltum and bronzing powder, and 6¼ gallons of benzole.

9. The method of making paint which comprises melting "D" grade asphaltum, allowing the asphaltum to cool to about 240° Fahrenheit, stirring in slowly commercial benzole, and when the solution is cool stirring in a bronzing powder.

10. The method of making paint which comprises dissolving "D" grade asphaltum in a volatile solvent and adding a bronzing powder.

11. A paint comprising "D" grade asphaltum, a volatile solvent for the asphaltum, and a bronzing powder.

12. A paint comprising a bituminous vehicle of substantially dark color, and a bronzing powder.

13. A paint comprising a bituminous vehicle of substantially dark color, a volatile solvent for the vehicle, and finely flaked metallic particles.

In testimony whereof, I have hereunto set my hand.

CORNELIUS S. FLEMING.